US012280731B2

(12) United States Patent
Choi

(10) Patent No.: US 12,280,731 B2
(45) Date of Patent: Apr. 22, 2025

(54) SCRIM AND METHOD OF MANUFACTURING THE SAME

(71) Applicant: HYUNDAI MOBIS CO., LTD., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/428,344

(22) Filed: Jan. 31, 2024

(65) Prior Publication Data

US 2025/0026299 A1    Jan. 23, 2025

(30) Foreign Application Priority Data

Jul. 17, 2023 (KR) .................. 10-2023-0092314

(51) Int. Cl.
*B60R 21/216* (2011.01)
*B60R 21/215* (2011.01)

(52) U.S. Cl.
CPC .. *B60R 21/216* (2013.01); *B60R 2021/21537* (2013.01); *B60R 2021/2161* (2013.01)

(58) Field of Classification Search
CPC ... B60R 21/203; B60R 21/205; B60R 21/215; B60R 21/216; B60R 2021/21506; B60R 2021/21512; B60R 2021/21531; B60R 2021/21537; B60R 2021/2161
See application file for complete search history.

(56) References Cited

U.S. PATENT DOCUMENTS

| | | | | |
|---|---|---|---|---|
| 5,072,967 A * | 12/1991 | Batchelder | .......... | B60R 21/2165 280/752 |
| 5,211,421 A * | 5/1993 | Catron | .................. | B60R 21/215 280/732 |
| 5,390,950 A * | 2/1995 | Barnes | ................ | B60R 21/2165 280/732 |
| 5,393,089 A * | 2/1995 | Pakulsky | .............. | B60R 21/215 280/732 |
| 5,398,960 A * | 3/1995 | Ravenberg | .......... | B60R 21/2171 280/732 |
| 5,447,327 A * | 9/1995 | Jarboe | ................. | B60R 21/2165 280/732 |
| 5,460,401 A * | 10/1995 | Gans | ..................... | B60R 21/215 280/732 |
| 5,482,317 A * | 1/1996 | Nelsen | .................. | B60R 21/231 428/36.1 |
| 5,564,731 A * | 10/1996 | Gallagher | ........... | B60R 13/0256 280/732 |
| 5,647,607 A * | 7/1997 | Bolieau | ................. | B60R 21/216 280/728.2 |
| 5,651,562 A * | 7/1997 | Hagen | .................. | B60R 21/216 280/728.2 |
| 5,685,930 A * | 11/1997 | Gallagher | ............... | B29C 65/48 156/290 |
| 6,378,894 B1 * | 4/2002 | Trevino | ................ | B60R 21/216 280/732 |

(Continued)

*Primary Examiner* — Laura Freedman
(74) *Attorney, Agent, or Firm* — NSIP Law

(57) ABSTRACT

A scrim including a body portion disposed on an airbag door, the airbag door being configured to open upon a deployment of an airbag, a bent portion disposed on a wall surface of an airbag chute, the airbag chute being formed in a mesh shape, and a hinge portion connecting the body portion and the bent portion, the hinge portion being configured to be partially folded to be seated in the airbag chute.

19 Claims, 6 Drawing Sheets

(56) References Cited

U.S. PATENT DOCUMENTS

| | | | | |
|---|---|---|---|---|
| 6,719,320 | B2* | 4/2004 | Gray | B60R 21/2165 280/728.3 |
| 7,178,825 | B2* | 2/2007 | Fujii | B60R 21/2155 280/732 |
| 7,210,700 | B2* | 5/2007 | Zagrodnick | B60R 21/215 280/743.2 |
| 7,992,890 | B2* | 8/2011 | Nogaret | B60R 21/215 280/732 |
| 8,011,689 | B2* | 9/2011 | Kong | B60R 21/215 280/728.3 |
| 8,371,610 | B2* | 2/2013 | Kreppold | B60R 21/2165 280/732 |
| 8,393,635 | B2* | 3/2013 | Laboeck | B60R 21/2165 280/728.3 |
| 9,045,106 | B2* | 6/2015 | Pauthier | B29C 45/14 |
| 10,604,099 | B2* | 3/2020 | Kim | B60R 21/216 |
| 11,173,862 | B2* | 11/2021 | Lee | B60R 21/215 |
| 11,254,278 | B2* | 2/2022 | Schulze-Wehnink | B60R 21/215 |
| 11,440,498 | B2* | 9/2022 | Schulze-Wehninck | B60R 21/2165 |

* cited by examiner

130

SCRIM AND METHOD OF MANUFACTURING THE SAME

CROSS-REFERENCE TO RELATED APPLICATION

This application claims the benefit under 35 USC § 119(a) of Korean Patent Application No. 10-2023-0092314, filed on Jul. 17, 2023, the entire disclosure of which is incorporated herein by reference for all purposes.

BACKGROUND

1. Field of the Invention

The present invention relates to a scrim and a method of manufacturing the same, and more particularly, to a scrim and a method of manufacturing the same capable of preventing a phenomenon of deviation and detachment when an airbag is deployed.

2. Discussion of Related Art

An airbag (in particular, a passenger airbag (PAB)) serves to minimize an occupant's injury in the case of a vehicle collision. The airbag is mounted inside a crash pad, and a cushion is deployed to protect the occupant when a door configured on the crash pad side is opened.

When the passenger airbag is deployed, a door portion of the crash door opens toward the passenger and the airbag is deployed. In this case, since there is a concern that the door portion of the airbag may be damaged by the deployment force of the airbag, a scrim is placed to prevent the door portion from being damaged and deviated toward the passenger. The scrim has a mesh structure in the form of a fabric sheet and is insert-molded to serve to hold the door portion of the airbag when the airbag is deployed.

A conventional scrim is designed to be deviated and detached from an airbag chute wall to compensate for an insufficient length of the airbag door. Therefore, a length of detachment and deviation of the scrim may be lengthened by a high pressure of an inflator, and in some cases, the scrim may be completely deviated. In particular, in the case of an electric vehicle, as the interior space of the vehicle becomes more spacious and the airbag to cover this space becomes larger, a high-pressure inflator may be used, which may cause a phenomenon where the scrim is completely detached or deviated when the conventional scrim is used.

When the scrim is completely deviated and detached, damage to the airbag door may occur, which may cause injury to the passenger as the airbag door is deviated toward the passenger. Therefore, there is a need for the scrim that can be stretched and stably hold the door portion of the airbag without being deviated and detached in tension.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a scrim including a body portion disposed on an airbag door, the airbag door being configured to open upon a deployment of an airbag, a bent portion disposed on a wall surface of an airbag chute, the airbag chute being formed in a mesh shape, and a hinge portion connecting the body portion and the bent portion, the hinge portion being configured to be partially folded to be seated in the airbag chute.

A partial fold of the hinge portion may be configured to be folded in a zigzag manner.

A folded portion of the partial fold of the hinge portion may be configured to be folded between an end of the body portion and an end of the bent portion.

The hinge portion may be fixed in a state of being folded through a fixture after being folded.

The fixture may include an open shape defined on a first surface of the fixture, the folded portion of the hinge portion may be fitted into an open portion of the open shape, and an end of the first surface may be disposed in the open portion of the fixture is bent inward and fixes the folded portion of the hinge portion.

The folded portion of the hinge portion may be fixed by bonding or adhesion using a double-sided adhesive tape.

A marking portion may be formed around the folded portion of the hinge portion to mark a folding line using a masking tape.

In a general aspect, here is provided a method of manufacturing a scrim including disposing a mesh sheet, folding a hinge portion of a body portion of the scrim from a portion of the mesh sheet, the body portion being configured to be provided on an airbag door that opens upon deployment of an airbag, a bent portion configured to be provided on a wall surface of an airbag chute, and a hinge portion configured to connect the body portion and the bent portion, and preforming the mesh sheet.

The folding of the hinge portion may include marking a folding line of the hinge portion, folding the hinge portion, and fixing the folded hinge portion.

The fixing of the mesh sheet may include sewing the hinge portion with a thread to maintain the hinge portion and that the sewing may be provided to allow the airbag to deploy with a force that unfolds the airbag without tearing the scrim.

The fixing of the mesh sheet may include providing a staple to the hinge portion to maintain the hinge portion and the staple may be configured to allow the airbag to deploy with a force that unfolds the airbag without tearing the scrim.

The preforming of the mesh sheet includes compression molding the mesh sheet.

In a general aspect, here is provided an airbag device including an airbag chute, an airbag door, and a scrim including a body portion disposed on the airbag door, a bent portion disposed on a wall of the airbag chute, and a hinge portion configured to connect the body portion and the bent position, the hinge portion including folded portions configured to extended a length of the hinge portion during a deployment of an airbag of the airbag device.

The hinge portion may be provided between an end of a body of the hinge portion and an end of the bent portion.

A portion of the hinge portion may be seated in the airbag chute.

The scrim may include a preformed mesh material.

The airbag device may include a fixing material configured to hold the folded portion in a folded state and to allow the airbag of the airbag device to deploy with a force that unfolds the airbag without tearing the scrim.

The fixing material may include a thread.

The fixing material may include a staple.

The fixing material may include an adhesive.

Figure 1:
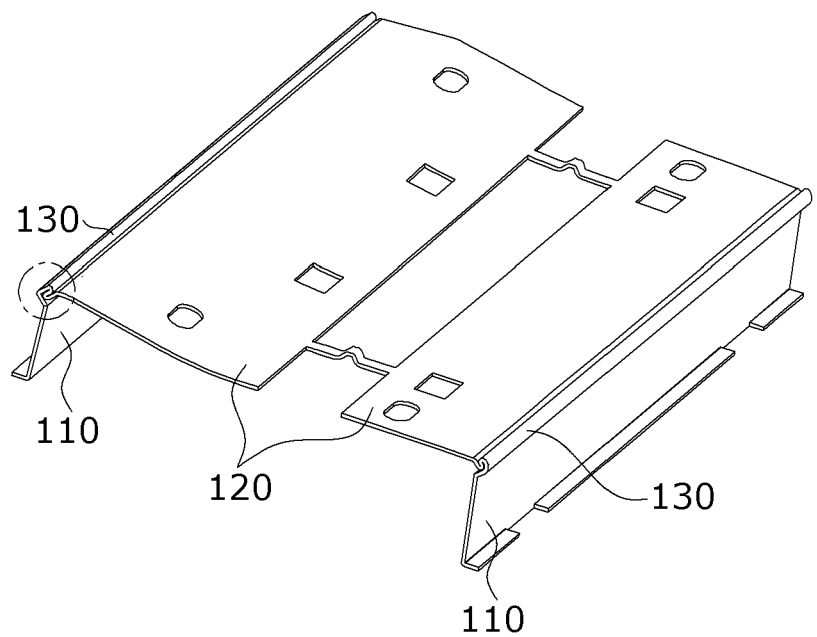
FIG. 1 is a view illustrating a scrim according to one embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims.

Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

One embodiment of the present invention is directed to providing a scrim and a method of manufacturing the same capable of stably holding an airbag door without being deviated and detached when an airbag is deployed.

Hereinafter, one embodiment of a scrim according to the present invention will be described in detail with reference to the accompanying drawings. In the description of the exemplary embodiments with reference to the accompanying drawings, the same or corresponding constituent elements are assigned with the same reference numerals regardless of reference numerals, and the repetitive description thereof will be omitted.

Figure 2:
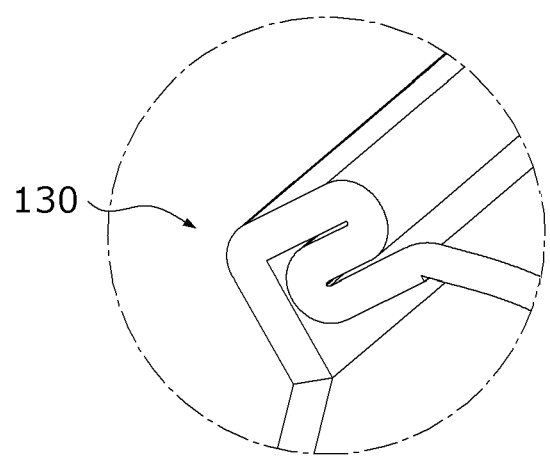
FIG. 2 is a view illustrating a hinge portion of the scrim according to one embodiment of the present invention.

FIG. 1 is a view illustrating a scrim according to one embodiment of the present invention, and FIG. 2 is a view illustrating a hinge portion of the scrim according to one embodiment of the present invention.

With reference to FIGS. 1 and 2, a scrim 100 according to one embodiment of the present invention may be disposed on an inner side of a crash pad formed with an airbag door that opens upon deployment of an airbag and an airbag chute 300 and may be formed in a mesh shape.

The scrim 100 may include a body portion 120 disposed on the airbag door, a bent portion 110 disposed on a wall surface of the airbag chute 300, and a hinge portion 130 connecting the body portion 120 and the bent portion 110, and the hinge portion 130 may be at least partially folded to be seated in the airbag chute 300.

When a passenger airbag is deployed, the airbag door of the crash pad opens toward the passenger and windshield, and the scrim 100 holds the airbag door and prevents the airbag door from being deviated and detached inside a vehicle. A conventional scrim 100 is formed in a mesh shape, even when a force is applied, an amount of stretching is not large due to a low elongation of a material. Therefore, the scrim 100 may hold the airbag door by compensating for an insufficient length of the airbag door when the scrim is torn or detached.

However, there is a risk that the airbag door may be detached and thrown into the interior of the vehicle when the scrim 100 is completely detached or deviated. In particular, in the case of an electric vehicle or autonomous vehicle that is currently under development, the space that the airbag needs to cover becomes larger while securing a larger space inside the vehicle. In order to stably operate the airbag, an inflator that deploys the airbag at a higher pressure than a conventional inflator may be used, and in this case, there is a risk that structures such as an airbag door may be detached and thrown inside the vehicle. Therefore, the scrim 100 is needed to stably hold the airbag door without causing damage such as detachment and deviation when the airbag is deployed.

In the case of the present embodiment, the scrim 100 that has both ends bent is exemplified in the scrim 100 that is disposed on an inner side of the airbag chute 300. The scrim 100 may be disposed on the inner side of the airbag chute 300, and may include the body portion 120 disposed on the airbag door and the bent portion 110 disposed on a wall of the airbag chute 300, and the body portion 120 and the bent portion 110 are connected by the hinge portion 130. While a conventional hinge portion 130 simply serves to connect the body portion 120 and the bent portion 110 without any particular configuration, in the present embodiment, a length of the hinge portion 130 is extended and the extended portion is folded to allow the scrim 100 to be disposed on the inner side of the crash pad and the airbag chute 300 in a folded state.

The hinge portion 130 may be formed as a separate piece and disposed on the scrim 100. Alternatively, the conventional scrim 100 may be formed to extend by a length of the hinge portion 130 and the extended portion may be folded so that the folded portion becomes the hinge portion 130. There is no limit to the manner of folding the hinge portion 130 as long as the folded portion is able to be easily unfolded to hold the airbag door when the airbag is deployed.

As illustrated in FIGS. 1 and 2, the hinge portion 130 may be disposed such that the folded portion of the hinge portion 130 is folded between an end of the body portion 120 and an end of the bent portion 110. The hinge portion 130 may be folded in a zigzag manner so that the folded portion is disposed on the inner side of the airbag chute 300.

Figure 3:
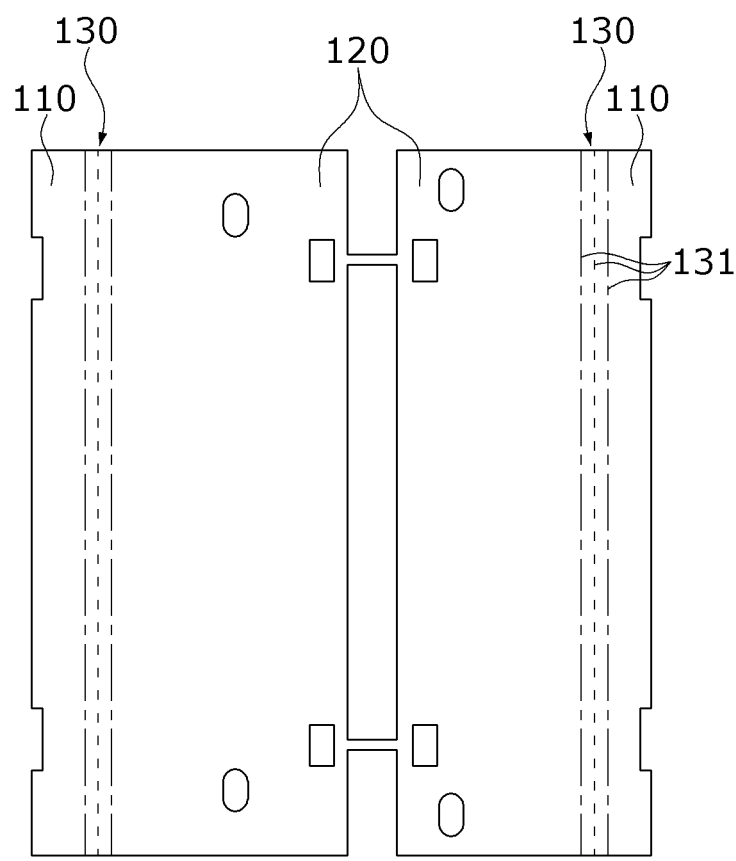
FIG. 3 is a view illustrating an unfolded state of a scrim according to another embodiment of the present invention.

FIG. 3 is a view illustrating an unfolded state of a scrim according to another embodiment of the present invention.

With reference to FIG. 3, a hinge portion 130 and a marking portion 131 that marks a line along which the hinge portion 130 is folded may be formed on the scrim 100. The marking portion 131 may be marked with a marking tool such as a masking tape or pen. The marking portion 131 may mark an area corresponding to the hinge portion 130, and may mark the line along which the hinge portion 130 is folded. In the case of FIG. 3, the hinge portion 130 may be folded as illustrated in FIG. 2, with the dotted lines folded inward and the solid lines folded to face each other.

Figure 4:
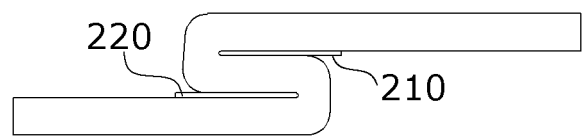
FIG. 4 is a view illustrating a hinge portion of a scrim according to still another embodiment of the present invention.
Figure 5:
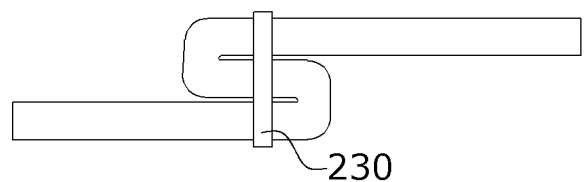
FIG. 5 is a view illustrating a hinge portion of a scrim according to yet another embodiment of the present invention.
Figure 6:
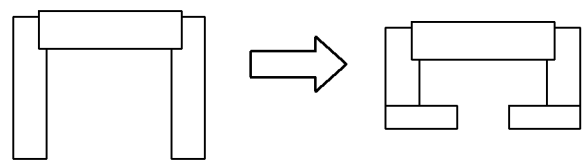
FIG. 6 is a view illustrating a fixture according to yet another embodiment of the present invention.

FIG. 4 is a view illustrating a hinge portion of a scrim according to still another embodiment of the present invention, FIG. 5 is a view illustrating a hinge portion of a scrim according to yet another embodiment of the present invention, and FIG. 6 is a view illustrating a fixture according to yet another embodiment of the present invention.

With reference to FIGS. 4 and 5, the hinge portion 130 may be fixed through a fixture 230 in a folded state, or may be adhered through a double-sided adhesive tape 210, an adhesive agent 220, or the like to maintain the folded state.

In the case of FIG. 4, the double-sided adhesive tape 210 or the adhesive agent 220 is applied between the folded surfaces of the hinge portion 130 to maintain the folded portion in the folded state. Since the scrim 100 is a fabric material with a mesh shape, the scrim 100 recovers to some extent to an original state when folded, and it is difficult to maintain a completely folded state. When the hinge portion 130 is fixed through the double-sided adhesive tape 210, the adhesive agent 220, or the like, the adhesive force may be required such that when the hinge portion 130 is unfolded upon deployment of the airbag, the folded portion may be easily unfolded by a force that unfolds the airbag door without tearing the scrim 100.

FIG. 5 illustrates a state in which the folded portion of the hinge portion 130 is fixed through the fixture 230. The fixture 230 may fix the hinge portion 130 in the form of staple and may fix the hinge portion 130 in a manner of sewing through a thread. There are no limitations on the material and size of the fixture 230 as long as the fixture 230 spreads out when the airbag is deployed and the hinge portion 130 may be easily unfolded.

The fixture 230 in FIG. 6 has one side with an open shape, the folded hinge portion 130 is fitted into the open surface of the open shape, and the ends of the both sides disposed in the open surface may be bent to hold the folded hinge portion 130 and fix the hinge portion 130. In an example, a folded portion of the hinge portion 130 may be provided in an open space defined by the open shape. The shape and material of the fixture 230 are not limited as long as the hinge portion 130 is able to maintain the folded state and be easily unfolded when the airbag is deployed. The fixture 230 may be applied in a plurality depending on the length of the hinge portion 130 and the manner in which the hinge portion 130 is folded.

Figure 7:
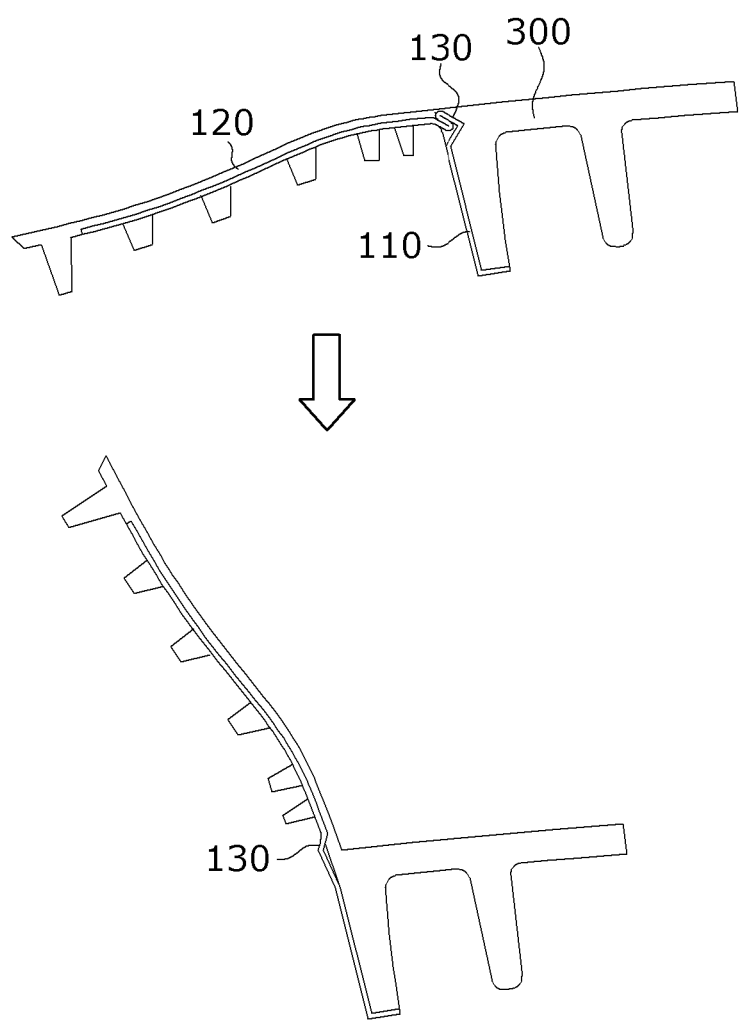
FIG. 7 is a view illustrating a state in which the scrim according to one embodiment of the present invention is deployed.

FIG. 7 is a view illustrating a state in which the scrim according to one embodiment of the present invention is deployed.

With reference to FIG. 7, it can be seen that the scrim 100 is disposed on the inner side of the airbag chute 300. When the airbag is deployed, the airbag door opens toward the interior of the vehicle. In this case, a length of a portion corresponding to the hinge of the airbag door will increase as the airbag door opens, and the hinge portion 130 may be unfolded in the folded state to cover the increased length. The hinge portion 130 may be unfolded to stably hold the airbag door so that the airbag door may not be detached and deviated to the interior of the vehicle to protect the passenger.

Figure 8:
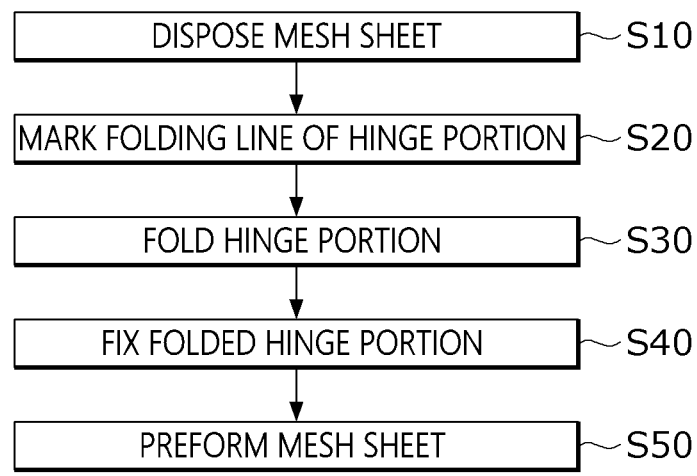
FIG. 8 is a flow chart illustrating a method of manufacturing the scrim according to one embodiment of the present invention.

FIG. 8 is a flow chart illustrating a method of manufacturing the scrim according to one embodiment of the present invention.

With reference to FIG. 8, a method of manufacturing a scrim 100, which includes a body portion 120 disposed on an airbag door that opens when an airbag is deployed, a bent portion 110 disposed on a wall surface of an airbag chute 300, and a hinge portion 130 connecting the body portion 120 and the bent portion 110, may include disposing a mesh sheet (S10), of folding the hinge portion (S30), and preforming the mesh sheet (S50).

Since the scrim 100 is formed in a mesh shape, the mesh sheet may be primarily disposed. The mesh sheet that is disposed may be cut to fit the size of the scrim 100 to be manufactured. Therefore, cutting the mesh sheet to a preset size may be performed before the disposing of the mesh sheet (S10).

When the mesh sheet is disposed, the folding of the hinge portion (S30) is performed. The hinge portion 130 may be manually folded by an operator, and the folding of the hinge portion (S30) may include marking a folding line of the hinge portion (S20), the folding of the hinge portion (S30), and fixing the folded hinge portion (S40). The marking of the folding line of the hinge portion (S20) may be performed in a manner of marking the hinge portion 130 and the line at which the hinge portion 130 is to be folded using a masking tape or pen on the unfolded mesh sheet. When the folding line is marked, the operator may fold the hinge portion 130 along the folding line.

After the hinge portion 130 is folded, the hinge portion 130 needs to maintain in the folded state, so that the hinge portion 130 needs to be fixed in the folded state. Therefore, the fixing of the folded hinge portion (S40) may be performed. The folded hinge portion 130 may be sewn with thread or fixed with the separate fixture 230. Without using a separate tool, the folded hinge portion 130 may be fixed in a manner that adheres the folded sides by applying the double-sided adhesive tape 210 or the adhesive agent 220 to the folded portion.

After the hinge portion 130 is folded and the folded hinge portion 130 is fixed, the mesh sheet may be preformed. The shape of the scrim 100 to be insert-molded may be formed through the preforming, and the scrim 100 may be formed into various shapes, such as a shape with the bent portion 110 bent or a straight shape through the preforming. The scrim 100 may be preformed to a preset shape based on a vehicle type or the like to which the scrim is applied.

The preforming process may be an operation in which the mesh sheet is compression molded. Since the mesh sheet is easily deformed by heat, it is possible to heat and compress the mesh sheet through a mold to form the mesh sheet into a preset shape.

According to one embodiment of the present invention, a folded hinge portion is formed in a scrim disposed on an inner side of a crash pad and an airbag chute, and the folded hinge portion can be unfolded upon deployment of the airbag and hold an airbag door from being detached and deviated.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A scrim, the scrim comprising:
    a body portion disposed on an airbag door, the airbag door being configured to open upon a deployment of an airbag, the body portion comprising a mesh sheet;
    a bent portion disposed on a wall surface of an airbag chute; and
    a hinge portion connecting the body portion and the bent portion,
    wherein the hinge portion is configured to be partially folded to be seated in the airbag chute and to unfold in the deployment of the airbag door, and
    wherein the body portion and bent portion are positioned on an inner side of the airbag door and the wall surface of the airbag chute, wherein the hinge portion is fixed in a state of being folded through a fixture, the fixture including an open shape defined on a first surface of the fixture,
    wherein a folded portion of the hinge portion is fitted into an open portion of the open shape, and
    wherein an end of the first surface disposed in the open portion of the fixture is bent inward and fixes the folded portion of the hinge portion.

2. The scrim of claim 1, wherein the partial fold of the hinge portion is configured to be folded in a zigzag manner.

3. The scrim of claim 2, wherein the hinge portion is fixed in a state of being folded through the fixture after being folded.

4. The scrim of claim 2, wherein the partial fold of the hinge portion is fixed by bonding or adhesion using a double-sided adhesive tape.

5. The scrim of claim 2, wherein a marking portion is formed around the partial fold of the hinge portion to mark a folding line using a masking tape.

6. The scrim of claim 1, wherein a folded portion of the partial fold of the hinge portion is configured to be folded between an end of the body portion and an end of the bent portion.

7. A method of manufacturing a scrim, the method comprising:
    disposing a mesh sheet;
    folding a hinge portion of a body portion of the scrim from a portion of the mesh sheet, the body portion being configured to be provided on an airbag door that opens upon deployment of an airbag, a bent portion configured to be provided on a wall surface of an airbag chute, and the hinge portion being configured to connect the body portion and the bent portion, wherein the hinge portion is configured to be partially folded to be seated in the airbag chute and to unfold in an opening of the airbag door; and
    preforming the mesh sheet,
    wherein the body portion and bent portion are positioned on an inner side of the airbag door and the wall surface of the airbag chute, wherein the hinge portion is fixed in a state of being folded through a fixture, the fixture including an open shape defined on a first surface of the fixture, wherein a folded portion of the hinge portion is fitted into an open portion of the open shape, and wherein an end of the first surface disposed in the open portion of the fixture is bent Inward and fixes the folded portion of the hinge portion.

8. The method of claim 7, wherein the folding of the hinge portion comprises:
   marking a folding line of the hinge portion;
   folding the hinge portion; and
   fixing the folded hinge portion.

9. The method of claim 8, wherein the fixing of the folded hinge portion comprises:
   sewing the hinge portion with a thread to maintain the hinge portion, and
   wherein the sewing is provided to allow the airbag to deploy with a force that unfolds the airbag without tearing the scrim.

10. The method of claim 8, wherein the fixing of the folded hinge portion comprises:
    providing a staple to the hinge portion to maintain the hinge portion, and
    wherein the staple is configured to allow the airbag to deploy with a force that unfolds the airbag without tearing the scrim.

11. The method of claim 7, wherein the preforming of the mesh sheet includes compression molding the mesh sheet.

12. An airbag device, comprising:
    an airbag chute;
    an airbag door, the airbag door being configured to open upon a deployment of an airbag; and
    a scrim comprising:
        a body portion disposed on the airbag door;
        a bent portion disposed on a wall of the airbag chute; and
        a hinge portion configured to connect the body portion and the bent portion, the hinge portion comprising folded portions configured to extended a length of the hinge portion during the deployment of the airbag,
    wherein the folded portions are configured be seated in the airbag chute and to unfold in the deployment of the airbag,
    wherein the body portion and the bent portion are positioned on an inner side of the airbag door and the wall of the airbag chute, wherein the hinge portion is fixed in a state of being folded through a fixture, the fixture including an open shape defined on a first surface of the fixture,
    wherein the folded portions of the hinge portion are fitted into an open portion of the open shape, and
    wherein an end of the first surface disposed in the open portion of the fixture is bent inward and fixes the folded portions of the hinge portion.

13. The airbag device of claim 12, wherein the hinge portion is provided between an end of a body of the hinge portion and an end of the bent portion.

14. The airbag device of claim 12, wherein a portion of the hinge portion is seated in the airbag chute.

15. The airbag device of claim 12, wherein the scrim comprises a preformed mesh material.

16. The airbag device of claim 12, further comprising:
    a fixing material configured to hold the folded portions in a folded state and to allow the airbag of the airbag device to deploy with a force that unfolds the airbag without tearing the scrim.

17. The airbag device of claim 16, wherein the fixing material comprises a thread.

18. The airbag device of claim 16, wherein the fixing material comprises a staple.

19. The airbag device of claim 16, wherein the fixing material comprises an adhesive.

* * * * *